United States Patent
Kramer et al.

(10) Patent No.: US 8,302,170 B2
(45) Date of Patent: Oct. 30, 2012

(54) METHOD FOR ENHANCING NETWORK APPLICATION SECURITY

(75) Inventors: Glenn A. Kramer, San Francisco, CA (US); Thomas H. Van Vleck, Ocean City, NJ (US)

(73) Assignee: Bespoke Innovations S.a.r.l., Geneva (CH)

( * ) Notice: Subject to any disclaimer, the term of this patent is extended or adjusted under 35 U.S.C. 154(b) by 470 days.

(21) Appl. No.: 12/564,087

(22) Filed: Sep. 22, 2009

(65) Prior Publication Data

US 2010/0077216 A1    Mar. 25, 2010

Related U.S. Application Data

(60) Provisional application No. 61/098,849, filed on Sep. 22, 2008.

(51) Int. Cl.
*H04L 29/06* (2006.01)
(52) U.S. Cl. ........................................................... 726/5
(58) Field of Classification Search ....................... 726/5
See application file for complete search history.

(56) References Cited

U.S. PATENT DOCUMENTS

| | | |
|---|---|---|
| 5,815,665 A | 9/1998 | Teper |
| 5,845,070 A | 12/1998 | Ikudome |
| 6,880,083 B1 * | 4/2005 | Korn ............................. 713/170 |
| 6,922,782 B1 | 7/2005 | Spyker |
| 7,131,000 B2 * | 10/2006 | Bradee ......................... 713/164 |
| 2001/0054155 A1 * | 12/2001 | Hagan et al. .................. 713/193 |
| 2004/0006693 A1 * | 1/2004 | Vasnani et al. ................ 713/168 |
| 2005/0202803 A1 * | 9/2005 | Mahalal ........................ 455/410 |
| 2006/0020815 A1 | 1/2006 | Varghese |

FOREIGN PATENT DOCUMENTS

EP    1320236 A1 *    6/2003

* cited by examiner

*Primary Examiner* — Michael S McNally
(74) *Attorney, Agent, or Firm* — Young & Thompson

(57) ABSTRACT

A method for securing communications between a server and an application downloaded over a network onto a client of the server is disclosed. A first request is received from the client, and in response a session credential security token is generated and sent to the client. A second request is received from the client to download the application and includes the value of the session credential security token. The server verifies that the value of the session credential security token is valid and, if so, generates a second security token that is tied to the session credential security token. The second token is embedded in application code and then the application code is sent to the client. A subsequent request for data from the application running on the client includes the value of the session credential security token and the value of the embedded security token. Verification of validity of the values of the session credential security token and the second security token received with the data request then occurs at least in part by determining that the values are cryptographically tied to one another. Upon verification, the requested data is sent to the client.

18 Claims, 6 Drawing Sheets

METHOD FOR ENHANCING NETWORK APPLICATION SECURITY

CROSS-REFERENCE TO RELATED APPLICATION

This application claims the benefit of priority of U.S. Provisional Patent Application No. 61/098,849 filed Sep. 22, 2008 and entitled "System and Method for Enhancing Network Application Security," the entire contents of which are incorporated herein by reference.

FIELD OF INVENTION

The present invention relates to a method for securing communications between a server and an application downloaded over a network onto a client of that server.

BACKGROUND OF THE INVENTION

A server may download an application into the client environment in order to perform a variety of tasks as well as typically to send data back to the server. Examples of such downloaded applications include Flash™ applications, Java™ applets, and ActiveX™ controls. Some of these applications (notably Flash and Java) run with a limited set of privileges, ostensibly so that they will not do damage to the client machine on which they are running, although exploits have occasionally been found (see for example, "Application-Specific Attacks Leveraging the ActionScript Virtual Machine." Mark Dowd, IBM Internet Security Systems which is available at http://documents.iss.net/whitepapers/IBM_X-Force_WP_final.pdf). Downloading applications dynamically (as in the case for Flash and Java) for each use ensures that the application is always up to date, assuming caching is disabled. As a result, version control issues are significantly reduced. The tradeoff is that time is spent downloading the application each time it is used; however, bandwidth issues have been greatly mitigated with the widespread adoption of broadband Internet connections.

Communications between a client application and the server from which it was downloaded often involve sensitive information and, as such, should be secure. For example, downloaded applications typically have access to small portions of the file system of the client computer. One such example is a cookie—see "HTTP State Management Mechanism." Internet Engineering Task Force Request for Comments 2965, which is available at http://www.faqs.org/rfcs/rfc2965.html). Another example is Flash's Shared Object storage mechanism—see "Local Shared Object." Wikipedia http://en.wikipedia.org/wiki/Local_Shared_Object. These storage mechanisms can be used to store client-specific data, which can potentially be of sensitive nature. The data may be encrypted, and a server may need to ensure that only applications it has recently downloaded (and which therefore are trusted) are given decryption keys.

As a result, it is normally desirable for the server to attempt to authenticate the source of communications to it. Authentication of the specific code is often an implicit assumption made by the server. For example, in a Java environment running inside a browser, the sandbox security model ensures that downloaded code can only communicate to the server host that the code originated from. Flash has similar restrictions. Some applications assume the converse: if communication to the server is occurring, it must be from a genuine applet. Such applications can be fooled by programs that simulate the downloaded application's messages.

The current state of the art for application authentication typically involves either digitally signing the application (and expecting the browser to validate the signature, especially in the case of privileges required outside of the standard sandbox), or the use of client-side public key certificates to authenticate installed client-side code to the server. See for example, "Public Key Infrastructure" Wikipedia, which is available at http://en.wikipedia.org/wiki/Public_key_infrastructure.

Insofar as digitally signed applications are concerned, the main objective is to protect the client machine. In effect, if the application is not digitally signed as required, the user should not trust it.

To ensure the integrity of the code that is connecting to the server, the server may require a client certificate for secure communication. A client certificate is typically used to authenticate the browser to the server, rather than authenticating the specific application to the server. Such certificates contain a public key that is paired with a private key. The public key identifies the owner of the certificate and is used for key exchange, while the private key is used to generate the public key, and, in practice, to prove that the public key is controlled by the owner. The private key is typically protected by a password. The security of such a system rests with the strength of the private key and the means used to secure it (e.g., not written down or hardwired into the computer). In addition, the public keys must be registered if one party is to have confidence in the identity of the other party.

An application could also utilize an embedded client certificate to make a secure connection to the server. However, it is more computationally expensive to do so using public key cryptographic operations since these take significant time to evaluate. Furthermore, the certificate could still be extracted from the downloaded code and used maliciously. Since certificates typically have a much longer lifetime than the downloaded code (again due to their expense), this remains a vulnerability for attack.

During communications between the server and the client requesting the downloaded application, the server may set a variety of session credentials, such as a session cookie—that is, a cookie that does not persist after the client browser is shut down—or other data stored in other browser code. The setting and subsequent sending of the session credentials in Request/Response messages may be governed by the client browser and the server, and not necessarily by the downloaded application itself. For examples, cookies are typically sent by the browser, even if a Flash SWF file or Java class file does not explicitly set them in the headers of a request to the server.

As described below, a variety of attacks are possible with the above-described architecture.

For example, in a network monitoring attack, the attacker, who may be located at any intermediate router along the Internet, may monitor and possibly modify communications between the application and the server. The use of strong encryption such as SSL or TLS generally serves to mitigate this possibility.

Similarly, in a man-in-the-middle attack, the attacker may interpose itself between the application and the server making independent connections with each and relaying messages between them, thereby leading the application and server to conclude that they are communicating with each other over a private connection when in fact the entire conversation is controlled by the attacker. If secure communication involves the use of public key certificates, impersonation of the parties by way of such an attack can be made less likely.

Even with the use of SSL/TLS and public key encryption technology, other potential threats that stem from greater potential vulnerabilities remain. In particular, such potential attacks include: (i) Trojans aimed at the network stack: (ii) machine compromise coupled with reverse engineering/emulation of the application; and (iii) cross site reference forgery (XSRF) attacks. Each of these is described further below.

An attacker could fool a user into installing a Trojan, keystroke logger, or other such program that can eavesdrop on and intercept data. Trojans can be unwittingly installed on client devices when a user opens infected email attachments, as described in "PDF Exploit Spam Used to Install Gozi Trojan in New Attack," Jackson, SecureWorks, available at http://www.secureworks.com/research/threats/gozipdf/?theat=gozipdf. Such programs generally appear to do something useful but also perform malicious actions—see "Reflections on Trusting Trust," Ken Thompson, 1984, which is available at http://www.ece.cmu.edu/~ganger/712.fall02/papers/p761-thompson.pdf. These programs may pose a significant threat even if they only possess the ability to read all network communications or all keystrokes (as opposed to being able to execute arbitrary code).

As a result, direct communication of keying information between the server and application can be risky, In particular, some of the more sophisticated Trojans, such as the Gozi Trojan, can inject themselves into the network protocol stack, for example by making use of the Layered Service Provider features of Winsock2 to actually intercept SSL/TLS data at a point before it is encrypted. See "Gozi Trojan," Don Jackson, SecureWorks, which is available at http://www.secureworks.com/research/threats/gozi/. If the server is providing sensitive data (such as encryption keys for data stored on the client), the data may not be safe. Furthermore, such generic attacks can gain access to a broad number of client machines with minimal effort.

With the second more serious threat mentioned above, a client machine may be compromised if an attacker successfully obtains root access to it and can execute arbitrary code on the client enabling the attacked to make arbitrary network connections. The attacker can then download the application from the server, reverse engineer it, and then alter the application to record the sensitive data such as encryption keys and to give the application further privileges, including the ability to communicate with arbitrary hosts. After installing the modified application on a client, the attacker uses this modified application to connect to the server, with the server assuming the code is legitimate because the required protocols are observed.

Finally, in a cross site reference forgery (XSRF) attack, another application may send a message to the server, taking advantage of the fact that the session credentials are stored in the browser for as long as it is open. Such an attack is described in "Cross Site Reference Forgery: An introduction to a common web application weakness." Jesse Burns, Information Security Partners, LLC. 2005, which is available at http://www.isecpartners.com/documents/XSRF_Paper.pdf. For example, if a user is logged into his brokerage account, and then surfs to a malicious newsgroup without first logging out of the brokerage system, the malicious newsgroup site could use JavaScript to issue commands to the brokerage via HTTPS URLs, and thereby could requests identical to what the browser would send in response to the user's interaction on the broker's actual site, and thereby manipulate the account (transferring money, making trades, etc.). Burns describes several techniques to help reduce the chance of XSRF attacks. One such technique involves passing cryptographic tokens in a URL response that are required to be sent back to the server in the next request. In effect, the security tokens (which an attacker should, of course, not know) are embedded in HTML code in the browser. However, HTML is easy to parse, and if the network stack is compromised, an attacker will be able to obtain these tokens. It is therefore not unreasonable to assume that for high-value transactions, the combination of network compromise and token replay will be attempted.

The above attack threats must also be tempered by the continual trade-off between user convenience, user knowledge and system security. For example, if client code is permanently installed on the client machine, it would be possible to install a public key certificate and a corresponding private key. However, many users are wary of installing code on their machines, which would limit the access or adoption rate of the network application. Furthermore even for those who choose to install, few will understand the concept of PKI and therefore the need for a password to protect the private key. Moreover, passwords are often forgotten, and if the system is truly secure and has no back door facility, sensitive data could be lost.

For these reasons, conventional network application security tends not to use such client-side certificates, but rather to create services that the user logs into, such as online banking and e-commerce shopping accounts. Keystroke logging attacks may be mitigated by using various graphical methods (see for example United States Published Patent Application No. US Patent Application 2006/0020815 entitled "Online data encryption and decryption."). Anti-phishing technologies such as SiteKey (see "SiteKey" Wikipedia, which is available at http://en.wikipedia.org/wiki/Sitekey) and multi-site visual authentication schemes (see for example, U.S. patent application Ser. No. 11/850,805 entitled "System And Method For Verifying Networked Sites") can also provide a user with a higher degree of confidence that he or she is dealing with an authentic site. Disadvantageously, however, these solutions require at least at some level user input or awareness.

In view of the above, there remains a need for a system and method capable of providing communications between a server and a client application downloaded from that server in a computationally efficient, up-to-date, and highly secure manner and without requiring any input or awareness on the part of the user of a client device.

BRIEF SUMMARY OF THE DISCLOSURE

The present invention addresses the above-described disadvantages of the prior art by providing a system and method for achieving enhanced security for network communications between a downloaded application and the server from which that application originated. The invention provides a system and method for a tamper-resistant communications channel from a dynamically downloaded client application resident in an end-user's Internet browser to the server that served the application. As will be appreciated, the network in question is most typically the Internet.

In particular, the present invention provides a computationally efficient method of improving the security of communication between a downloaded application running in an Internet browsing context and the secure application server (SA server) that downloaded the application to that context. The SA server preferably determines that the application is running in the specific browsing context to which it was downloaded, and can determine other attributes of the downloaded application, such as the time the download occurred and/or the download IP address. In this manner, the SA server can then verify all messages that originate from the application to ensure that they are coming from the specific client context into which the application was downloaded; the SA server can also determine when the application was downloaded, and it may choose to refuse to service requests from application instances that were downloaded too long ago.

In one embodiment, the SA server alters the application's downloaded code so as to include one or more unique cryptographic tokens that can be sent to the server in subsequent communications for authentication, or used as shared keying material. Additionally, the server sets session credentials—stored in the browser in application code or in a cookie—that are cryptographically tied to the tokens. Whenever the application communicates back to the SA server, it sends at least one token as part of its request, as well as the session credentials. The server can check the session credentials and token to see if they are consistent. If they are not, the SA server interprets this to mean that the downloaded code has been tampered with (for example, moved to another browser) or the browser's session credentials have been tampered with. Tokens not sent in requests can be used to provide application-level encryption or verification, rather than relying on SSL, which is susceptible to Trojan Horse attacks. The session credentials and tokens themselves can contain encrypted data, such as a timestamp or IP address, so anomalous values can be detected and potential attacks dealt with appropriately. This guards against an attacker attempting to reverse-engineer the application and re-use the token in an altered application.

This and other embodiments and variations are described further below.

BRIEF DESCRIPTION OF THE DRAWINGS

The objects and advantages of the present invention will be better understood and more readily apparent when considered in conjunction with the following detailed description and accompanying drawings which illustrate, by way of example, preferred embodiments of the invention and in which.

DETAILED DESCRIPTION OF PREFERRED EMBODIMENTS

Figure 1:
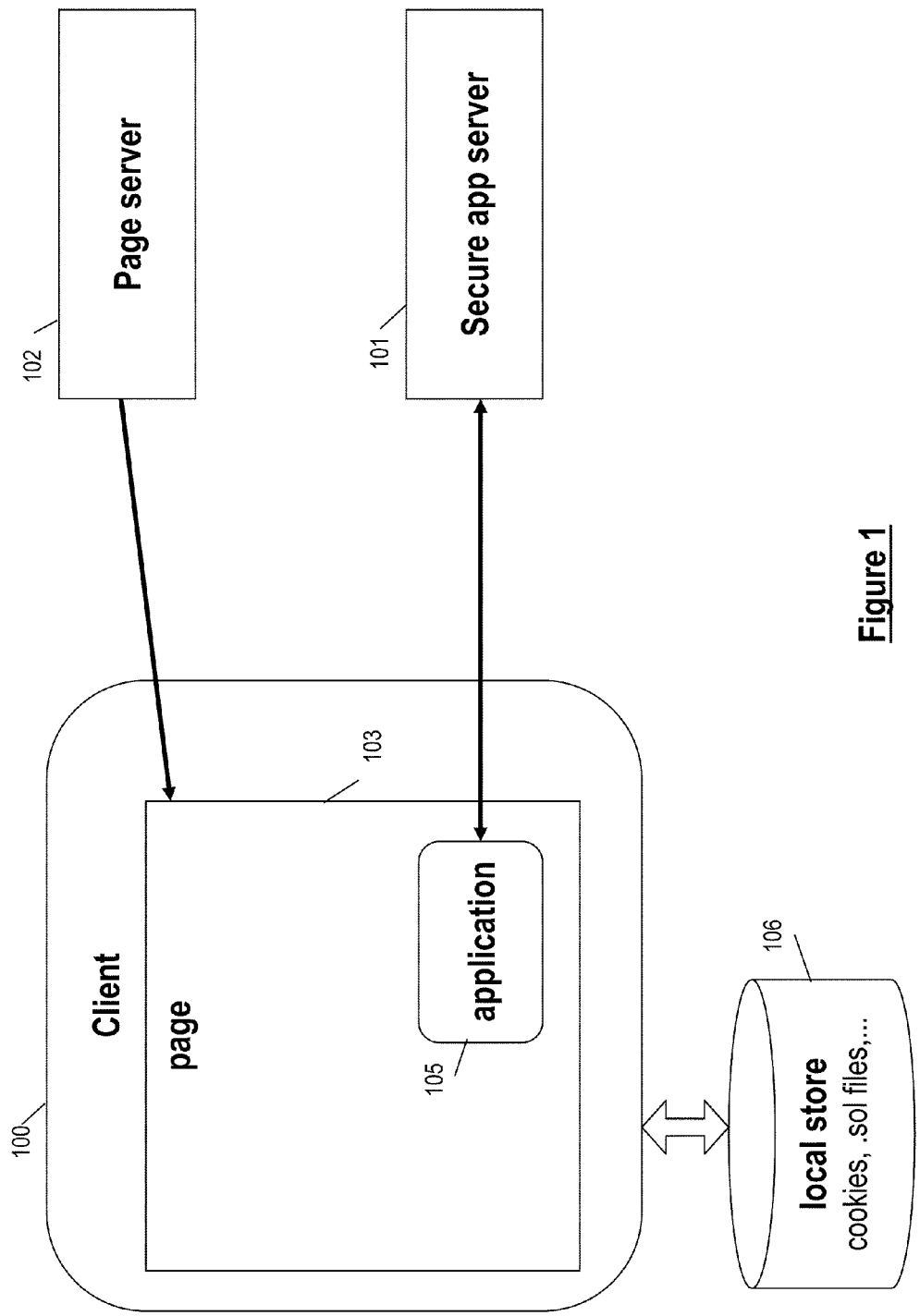
FIG. 1 is a block diagram showing a general overview of a typical network topology in which the system and method of the present invention may be used.

FIG. 1 is a block diagram illustrating a typical network configuration between a client device 100, a secure application server 101 (referred to below as the SA server or as just SAS), and a content or page server 102. The client 100 is configured to display a page 103 that is downloaded from the page server 102. In this scenario, part of the content of page 103 references an application 105 that is to be downloaded from SA server 101 so that the application can be embedded in that content. As described further below, when the SA server receives an appropriate request from client 101, the application 105 is downloaded. Application 105 may also be referred to as an applet herein.

Depending on the embodiment, SA server 101 may be the same server as page server 102, a distinct but related server, or a distinct and unrelated server. As will also be appreciated, a plurality of secure application servers and/or page servers may be distributed across the network in order to facilitate scalability of the system for a large number of clients.

Client 101 is generally a device (combination of hardware and software) used by a user to view Internet content. A typical example of a client is Mozilla Firefox™ running on a personal computer; another is Safari™ running on an iPhone™. The client also generally has a mechanism for local storage 106, such as browser cookies, Flash .sol files, and/or other user-data storage.

Figure 2:
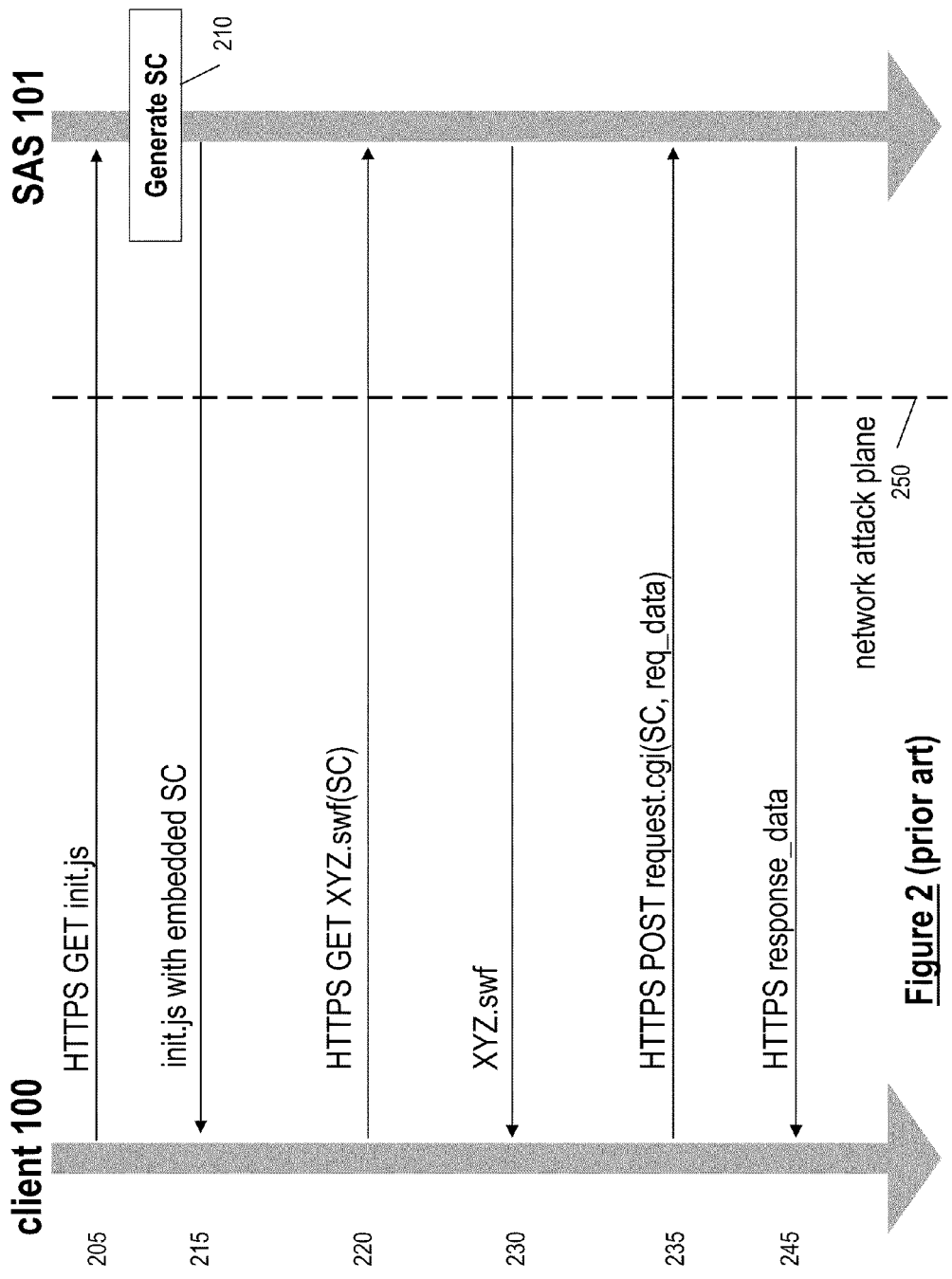
FIG. 2 is a ladder flow diagram depicting communication between an application server and a client according to the state of the art.

FIG. 2 is a ladder flow diagram depicting a typical set of communications between the client and the SA server as a ladder diagram when an application 105 is downloaded in accordance with the current state of the art.

The client 100, having previously downloaded a page from the Page Server 102, attempts to download JavaScript and application code from the Secure Application Server. Throughout the description below, it will be assumed without loss of generality that application 105 is a Flash application, referred to as XYZ.swf. However, the system and method of the present invention are applicable to any similar downloaded applications, such as Java applets. The download is initiated via message 205, which in the present example is an HTTPS GET request for init.js or another similar secure request that verifies the identity of the SA server (the file init.js includes code that will request application XYZ.swf from the SA server 101). However, in other cases the strong authentication of the SA server may not be necessary, or may occur implicitly in other aspects of the communication exchange.

Having received the request in message 205, SA server 101 generates session credential information SC as shown at step 210. As will be appreciated, the attributes or data type of SC will vary depending on programming language and other factors. If the user is required to log in, the value of SC may be derived in part from password information. Whether or not the user is required to log in, it is generally beneficial for the server to have some means of identifying whether a given SC is valid. In addition, SC may include session timeout information and other related information.

Thus, as shown, the server receives the HTTPS GET request for file init.js in message 205, computes a new SC value in step 210, and embeds that value SC in response message 215. To maintain session state, the value of SC may be set using mechanisms common to most content servers. In particular, the session credentials SC may be set via the Set-Cookie HTTP header or as an explicit variable in the returned init.js file.

At this point, the SA server 101 assumes it is dealing with a legitimate client browser; however, as described above the server could in fact be dealing with an attacker intent on obtaining any secrets the SA server would later be sharing with a downloaded application.

The client requests the application file XYZ.swf in message 220, and the server returns it in message 230. At this stage, the client application 105 (i.e., XYZ.swf) can perform calculations, access local storage, etc. If the application 105 requires sensitive data, such as a decryption key, it may send another request back to the server, as message 235. As illustrated, the req_data in that message is processed by the SA server, and response_data is sent back in message 245 for the client application to use.

A network attack plane 250 shown in FIG. 2 illustrates a particularly vulnerable part of the communication process. For example, the user is susceptible to phishing and pharming attacks that send the user to a bogus web site instead of the expected site—see the Anti-Phishing Working Group site at http://www.antiphishing.org/. These attacks may be mitigated if the user is knowledgeable enough to understand SSL certificates and URL structure, but this is not the case for many users. While the present invention does not directly reduce phishing/pharming attacks, the system and method of the present invention may be advantageously combined with an anti-phishing/pharming tool such as that disclosed in U.S. patent application Ser. No. 11/850,805 entitled "System And Method For Verifying Networked Sites", the contents of which are incorporated herein by reference.

Another potential vulnerability is the sniffing of information on the network, notably by capturing and analyzing data packets as they flow across the network. As noted above, this risk can be significantly reduced by encrypting information under SSL.

More significantly, as described in greater detail above, the SA server 101 and client 100 of FIG. 2 are overly vulnerable and susceptible to the potential threats posed by attacks involving Trojans aimed at the network stack, machine compromise coupled with reverse engineering/emulation of the application 105, and cross site reference forgery (XSRF).

In accordance preferred embodiments of the present invention, to alleviate these and other network security threats, SA server 101 embeds a security token into the application 105 before it is downloaded to client 100. The downloaded application 105 then sends the token back to the SA server when making a subsequent request, and the SA server checks the token for validity before responding to such requests.

In a preferred embodiment, the SA server 101 generates a first security token comprising encrypted session credential information that is sent to the client and then typically stored in the browser in application code or in a cookie. The SA server further computes a second security token that is cryptographically tied to the first token and that is then securely provided to the client along with application 105. Preferably this occurs by altering the application's code so as to include the second token prior to downloading. The second token can then be sent by the application to the SA server in subsequent communications for authentication. Alternatively, the second token may be used as shared keying material.

In a preferred embodiment, when the application 105 communicates back to SA server 101, the application sends the second security token as part of its request, as well as the first token comprising the session credential information. The SA server 101 can check the session credentials and token to see if they are consistent. Furthermore, in some embodiments in which sensitive data is being communicated between SA server 101 and application 105, the SA server may generate additional security tokens that are tied to the first token in order to enable application level encryption and/or to achieve additional verification of data requestors. Preferably, SA server 101 also verifies that application 105 (i.e., an instance of the application) was downloaded sufficiently recently as part of the verification process. This capability is useful if the downloaded application performs some sort of authentication or other time-sensitive task.

In other embodiments of the present invention, there may not be a requirement to tie the application to the browser context. In this case, the first token with session credential information need not be constructed or sent, and only the second token is generated by the SA server and transmitted to the client with the downloaded application 105, the information in this security token being used to verify such information as the application's download time and/or client IP address.

Figure 3:
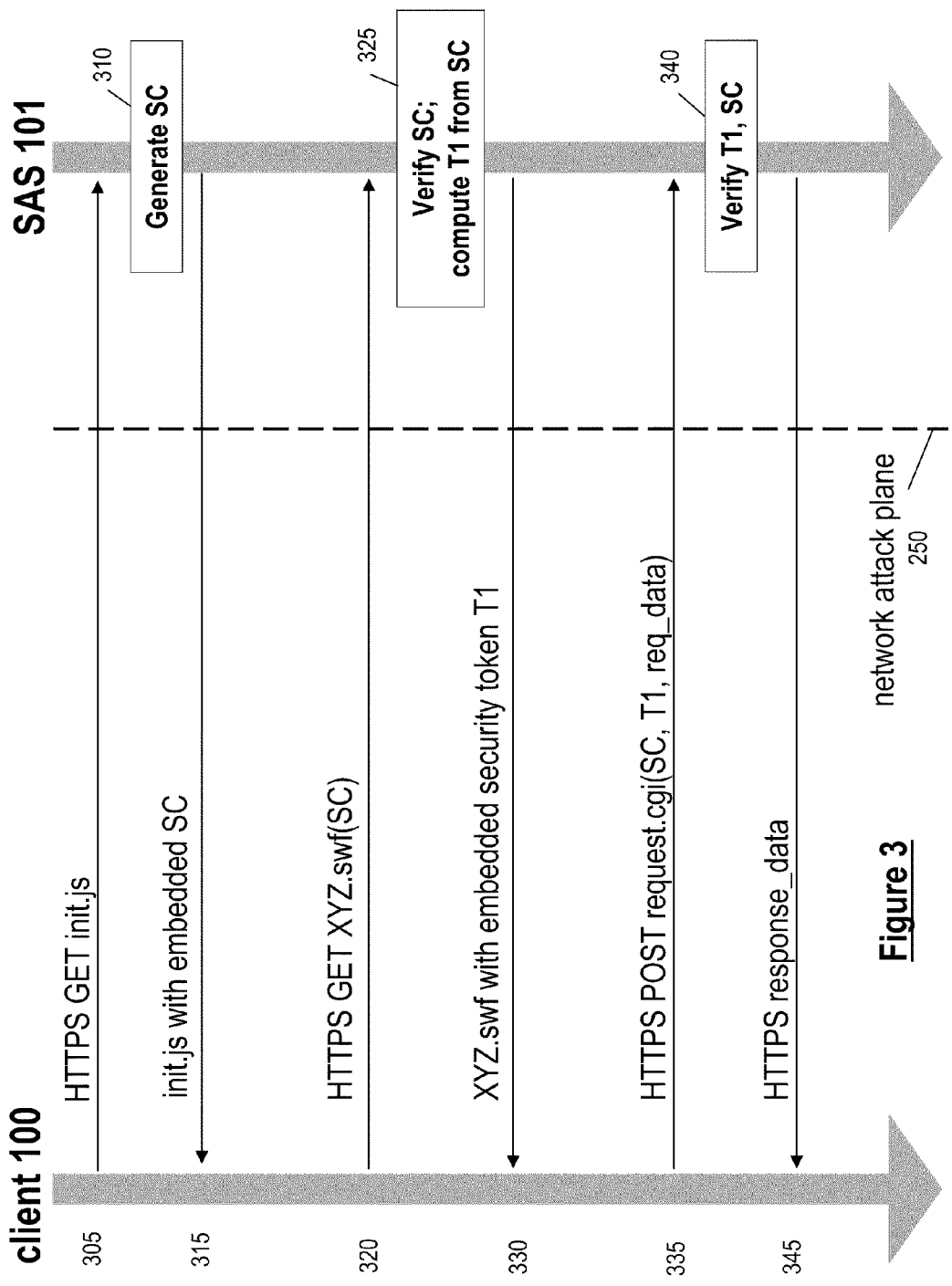
FIG. 3 is a ladder flow diagram in accordance with a first embodiment of the present invention and depicts communications between an application server and a client that are secured using a pair of security tokens to verify that the application is downloaded in the correct client context and within a prescribed time period.

FIG. 3 is a ladder flow diagram depicting communications between the client and the SA server in accordance with a first embodiment of the present invention. The session credential information is generated as a security token in order to enable the SA server 101 to verify that the application making the request was downloaded into the specific context of the client browser session. For illustrative purposes, the browsing context can be considered to be any state-of-the-art web browser such as Mozilla Firefox (this will simply be referred to as the "client" or "browser" below).

As shown, the client makes a request 305 for JavaScript file init.js, as was done in message 205 of FIG. 2. The SA server 101 receives this HTTPS GET request and then calculates session credential information SC, in step 310. As described below, the SA server first computes a random value R and then generates SC(R). In particular, in a preferred embodiment, the session credential information SC is generated by SA server 101 from the following properties/information:

1. A large random number R, of a size sufficient to ensure that it is highly unlikely that the same random number will be generated again in some relatively long period of time. For example, R may be of the same or comparable size to the result of a hash function's output (e.g., 20 bytes for SHA). The value of R serves as a public session identifier.
2. A payload of other data that is encrypted (i.e., enciphered or obfuscated in any appropriate manner) so that the server may verify certain properties of any future transaction. Some items that might be in such an encrypted payload, P, may include (but are in no way limited to):
    a. the creation time of the token SC
    b. a private session identifier, I
    c. the IP address of the client making the request
    d. information about the client browser
    e. application specific data The random number R and the encrypted payload P are digitally signed by means of cryptographic hashing of the random number and payload with a secret known only to the server. For example, one possible encryption formula that meets these requirements is provided as follows:

$$SC(R)=TOKEN(`SC`,R)$$

where:

$$TOKEN(t,R)=R+E(P,S1[t])+H(R+E(P,S1[t])+S2[t])$$

Here t is the data type of the security token, R is a random number generated by the server, E is an encryption or reversible obfuscation function, P is the payload data, S1 is an associative array of secrets known only to the server, S2 is another such array, H is a secure hashing function such as SHA1 or SHA256, and '+' is concatenation of the appropriate type (for example, R, P, S1 and S2 may all be byte arrays or strings).

Numerous variations on the above token generation formula are possible. For example, the two secret arrays S1 and S2 could by turned into a single array S:

$$TOKEN(t,R)=R+E(P,SW)+H(R+E(P,SW)+S[t])$$

Additionally, the above formulation assumes that the type of token is known to the SA server 101 via some external mechanism, such as the token's place in the arguments of a function or message. If the type must be explicitly supplied, the token may take a slightly different form, such as:

$$TOKEN(t,R)=t+R+E(P,S[t])+H(R+E(P,S[t])+S[t])$$

As will be appreciated by those of ordinary skill in the art, the above security token examples are presented by way of illustration only, and many others alternatives are possible.

Referring again to FIG. 3, once generated, SA server 101 embeds the value of SC in the init.js file in response message 315. This value may be set via the Set-Cookie HTTP header or as an explicit variable in the returned init.js file. As already noted above, the file init.js includes code that will request application XYZ.swf from the SA server 101. This request thus subsequently occurs in message 320, with the client 100 passing the value of SC back to the server, either explicitly in the content of the page returned from the requested URL, or implicitly via the Set-Cookie HTTP header.

Upon receipt, the SA server 101 verifies at step 325 that the server in fact generated token SC. In general, when presented with a token of a given type, the SA server 101 can extract its constituent parts: the random number R, the payload data P, and the signature data $H(R+E(P,S[t])+S[t])$. The signature can be checked for message integrity, and if it is found to be lacking, an attack can be assumed by the SA server and a response denied. For instance, since the hashing operation $H(R+E(P,S1[t])+S2[t])$ is essentially a method of digitally signing the data $R+E(P, S1[t])$, any server that knows what type of token it is verifying can verify that it (or that another server that knows S1[t] and S2[t]) created the token by verifying $H(R+E(P,S1[t])+S2[t])$.

It should be noted that all servers that share the array of secrets S will be able to generate tokens as well as verify that a particular token was digitally signed by one of the servers. Thus, verification of a token can occur on a different server instance than where that token was first created, making the process stateless. For example, when there are large numbers of server machines in a data center, any server can verify application communication from a downloaded application that originated from another server in the same data center. More generally, as already mentioned above, SA server 101 may in fact be implemented by any collection of server instances (whether in the same or different data centers) that share the secrets vector S, thereby ensuring scalability to large systems.

By placing a relatively short time limit on how long a downloaded application can communicate back to the server, it may become impractical to alter the application's proof of identity and re-use it subsequently (i.e., a replay attack). Thus, step 325 may further include decrypting or de-obfuscating payload data to extract a timestamp from the payload. In this manner, the chance of replay attacks is minimized by refusing older requests that have timed out.

Once SC is verified in step 325, the SA server 101 further calculates, using the same security token formula, a second security token T1 that is cryptographically tied to SC. As will be appreciated by those of ordinary skill in the art, two tokens T1 and T2 are considered to be cryptographically tied to each other (i.e., the tokens are considered to match) if the SA server's decision procedure returns "true" when comparing the tokens.

For instance, one way to enable the tokens to be tied together is by re-using the same random number R when generating the tokens, even if the encrypted payload data is different for each. Although the attacker may know the value of R, the attacker should still not be able to create its own cryptographically tied token without also knowing the corresponding secret in array S. In other words, knowing TOKEN ('SC', R) does not allow the attacker to generate TOKEN ('T1', R) because the attacker does not know the secret S['T1'], which is known only to the SA server 101.

Another way for the two tokens to be cryptographically tied to one another is for at least some portion of the encrypted payload data to be the same. For example, if both tokens contain a session identifier I stored in the payload data, then various token types could use different values of R and still be tied via I. This tying would not be apparent to attackers since I is part of the encrypted payload. Taking P as the remaining payload, then the token creation function could become:

$$TOKEN(t,R,I)=t+R+E(P+I,S[t])+H(R+E(P+I,S[t])+S[t])$$

Since I is hidden from the attacker by virtue of being encrypted under S[t], only the SA server will be able to decrypt the data associated with two different tokens and compare the value of I in each one to see if they are the same.

More generally, other alternatives are possible for cryptographically tying tokens together, and without loss of generality the description below simply refers to tokens as being tied (i.e., a match) or not tied (i.e., a mismatch).

The security token T1 is then embedded in XYZ.swf and delivered to the client in message 330. In this manner, each request with a different SC will result in a different XYZ.swf file being delivered to the client. In contrast to prior art solutions that embed security tokens in HTML code in the browser, in the system and method of the present invention security tokens are much more securely embedded in the code of application 105.

Generally, a security token T can be embedded within various portions of code including, but not limited to: cookies, JavaScript, Flash SWF files, and Java class files. In particular, in many languages string constants and byte array constants can be declared in the source code, and the object code will have a suitable location that can be easily determined by inspection. Using Flash as an example, XYZ.swf can be compiled with a "dummy" value for T. This dummy value should be unique and easy to find in the SWF file. The byte stream for XYZ.swf is analyzed for the presence of the unique dummy value, and once found the actual value T is substituted for the dummy value in all the appropriate places. As long as the size of T and the size of the dummy value are the same, class file integrity is maintained. If the server is able to manipulate the byte code of the SWF more dexterously, the length of T could vary. For example, Adobe's AVM2 virtual machine contains prefix bytes that specify the length of each data field in the virtual machine.

Furthermore, while the above-described embodiment involved a straightforward substitution of a security token for a "dummy" token in static code, the security token could alternatively be split up, encoded, and obfuscated in various ways, making an attack extremely difficult. In this case, application 105 would decode and re-assemble the security token on the client-side. In a simple example, the token T1 might be computed by application 105 by assembling substrings from various locations in the code of XYZ.swf. In a more complex example, a technique involving arbitrary manipulation of the byte code of the virtual machine could be used to make decompiling by an attacker more difficult—see for e.g., the SWF obfuscator offered by Kindisoft which is described at http://www.kindisoft.com/secureSW/index.php). Furthermore, any such encoding or obfuscation need not be static but may vary over time or over multiple variants of the application code so as to further frustrate attacks. In effect, the very tactics that virus writers employ to evade detection may be used in the present invention to help protect sensitive data.

Referring once again to FIG. 3, when the client code in XYZ.swf requests sensitive data from the SA server via message 335, it sends token T1 explicitly, and token SC either explicitly or implicitly (as described for message 320). The SA server then can verify each token SC and T1 for validity and timeout (plus any other validation needed as provided for in the encrypted payload data) in step 340. In accordance with this embodiment, the SA server first verifies each of tokens SC and T1 (including that they have not timed out) and then further verifies that SC and T1 are tied (i.e., match). Only after these checks are made does the SA server send response message 345 to the client.

In the ensuing description, the shorthand:

SC=TOKEN('SC',R,I)

T1=TOKEN('T1',R,I), etc.

may be used for conciseness, i.e., the arguments to the token function will be dropped, under the assumption that the values of R and I (if present) are clear from the context. On the other hand when it is desired to distinguish between tokens that have different random numbers or session identifiers, an integer will be used to distinguish the random numbers, e.g. T1(R1, I1) vs. T1(R2, I1).

It should be noted that, provided random values R or I are taken from a large enough space, and that the randomness is of reasonable quality, the chance of one randomly generated number R1 being the same as another randomly generated number R2 can be made arbitrarily small over any desired interval of time. Therefore, if the SA server 101 is presented two tokens, SC and T1, and it verifies the signature of the tokens, it can then determine if the two tokens are tied to each other by comparing the random number component.

In all embodiments, if the SA server is given one token SC(R), it can verify SC(R) and compute a cryptographically tied token T1(R), with the only state required being the secrets for token types SC and T. The tokens do not have to all be generated at one time, and any set of related tokens can be verified.

The table below encapsulates one embodiment of the logic that SA server 101 may use in validating or matching SC and T1 against each other. In this table, it is assumed that the client IP address was encoded in the payload data for tokens SC and T1. In addition, with each HTTP request to the server, the client IP address is sent, so the current client IP address (represented in the table below as "cIP") is available at time of token validation.

The SA server computes whether T1 and SC match, as well as whether the cIP matches either or both of those tokens. A "match," with respect to the tokens, means that the tokens are cryptographically tied (as described above); while with respect to cIP and a token, a "match" means that the IP address in that token matches the current cIP. This table also includes cases for when SC is missing, which could be the case if it is transmitted as a cookie and then subsequently deleted. Information can be obtained from the different possible combinations of values, as summarized in the following table:

| T1&SC | T1&cIP | SC&cIP | Analysis |
|---|---|---|---|
| match | match | match | Legitimate request |
| match | mismatch | mismatch | Likely legitimate (IP address change?) -log |
| SC missing | match | SC missing | Questionable, require reload of page -log |
| SC missing | mismatch | SC missing | Probable attack, require reload of page -log |
| mismatch | — | — | Attack - log |
| T1 missing | T1 missing | — | Attack - log |
| T1 expired | T1 expired | — | Attack or browser open too long - log, require reload |
| SC expired | — | SC expired | Attack or browser open too long - log, require reload |

If T1, SC, and cIP all match, the request is deemed legitimate—which is the normal, expected case.

If cIP doesn't match T1 and SC, but T1 and SC match each other, it is possible that the cIP has changed. This could happen, for instance, when a user puts a laptop into hibernation mode and then moves to another network before powering it up again.

In embodiments where SC is set as a session cookie, a missing SC should be suspect. It is possible that the SC token was wiped by the user cleaning cookies. In that case, T1 and cIP should still match, and the SC could then be generated again. But if T1 and cIP do not match, then this is likely an attack and the request should not be honoured and it should be logged for further analysis. If cookies are not used and SC is supposed to be explicitly sent as part of the JavaScript sent to the client, then all cases of missing or mismatched SC are considered attacks.

If T1 and SC don't match one another, this is an attack and the event should be logged for further analysis. Likewise, if T1 is missing in the request, this is an attack.

Finally, if T1 and/or SC are matching but were issued too far in the past, this could be an attack based on analyzing the code of an older copy of the downloaded application and extracting the values from it to use in request messages. A reload should therefore also be required in these cases.

The above-described embodiment of the present invention presents a heightened ability to detect attacks in part because there are two, somewhat independent paths along which information can flow: (1) the client browser's cookie mechanism or JavaScript, for SC; and (2) the downloaded application's embedded token T1, which is resident only inside the (ostensibly protected) memory in the client, and enters and leaves that protected memory only in an encrypted channel between the application's environment and the SA server 101.

However, in a simpler embodiment, the SA server may simply generate session credentials as in FIG. 2. In this case, the SA server would still generate and embed the security token T1 into the application code as described above and require that this token be resent by the application and verified (e.g., in terms of the application's download time and/or client IP address) prior to the SA server sending any data to the client.

The embodiment of FIG. 3 enables the SA server 101 to determine whether an application is tied to the specific browser context, and whether it is recent. However, the embodiment of FIG. 3 does not address the issue of encryption of sensitive data. As a result, a Trojan that is sniffing the network stack could still access the sensitive data.

Figure 4:
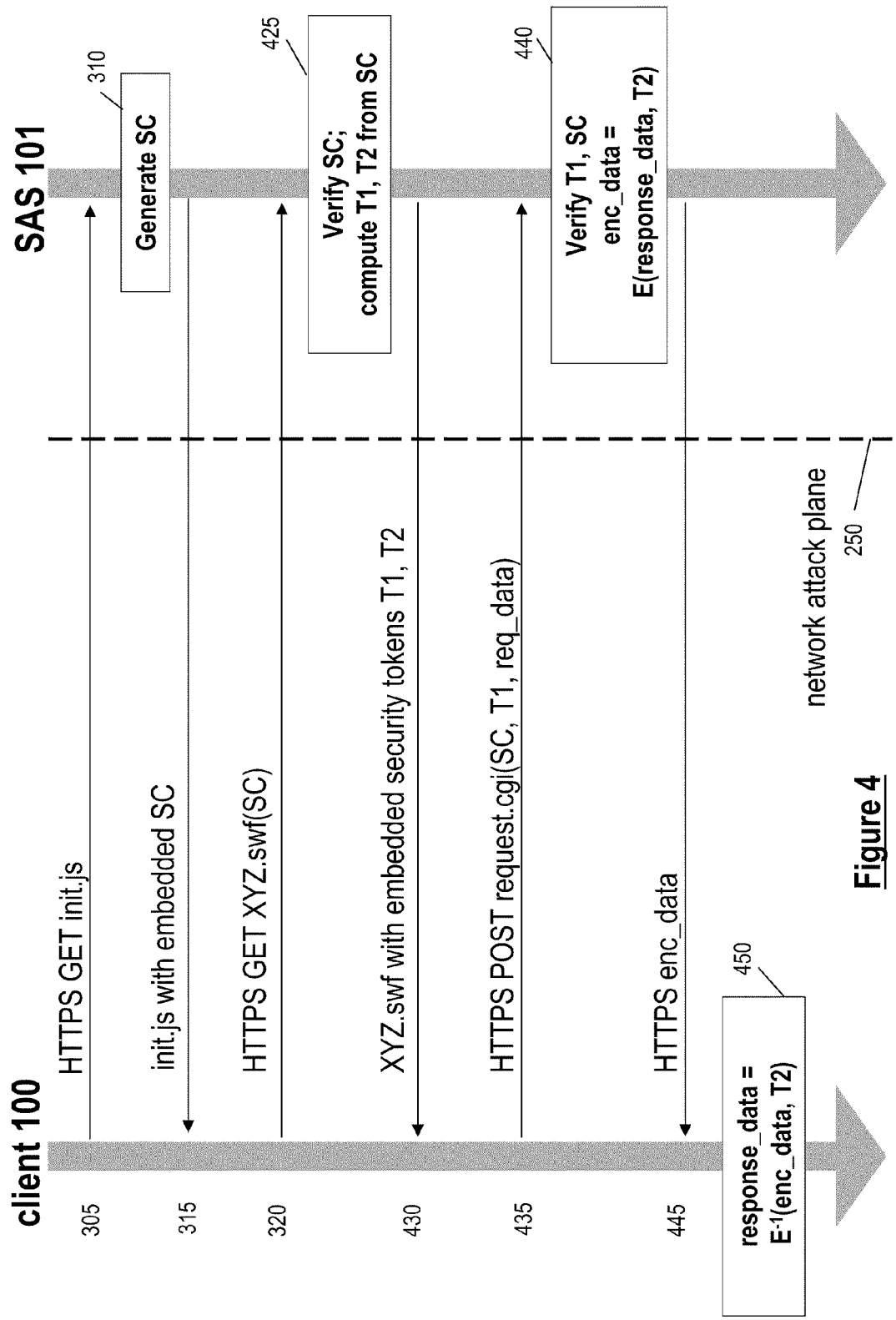
FIG. 4 is a ladder flow diagram depicting communications between the application server and client in another embodiment of the present invention in which an additional security token is used to enable application-level encryption of sensitive data.

FIG. 4 is a ladder flow diagram illustrating server-client communications in a second embodiment of the invention in which application level encryption is provided by way of an additional cryptographic token. In FIG. 4, the initial messages and processing steps 305, 310, 315, and 320 occur exactly as in the protocol of FIG. 3.

The embodiment FIG. 4 differs from that of FIG. 3 in the computation used to deliver the unique instance of XYZ.swf to the client 100. This occurs in step 425. In this step, the SA server verifies SC and computes T1 in the same manner as in step 325 of FIG. 3. However, in step 425 the server further generates another security token T2 that is also tied to SC and T1. Both T1 and T2 are then embedded in application XYZ.swf and sent to the client in message 430. Again, as with FIG. 3, the values of T1 and T2 may be obfuscated in arbitrary ways.

When, in message 435, the application XYZ.swf requests sensitive data, the SA server once again validates T1 and SC for consistency at step 440. Then, instead of sending the response_data directly back to client 100 (as was done in message 345 of FIG. 3), the server further computes:

enc_data=$E$(response_data,$T2$)

at step 440. Here E is an encryption function such as AES, and T2 is used as a source for keying material for the encryption. The resulting enc_data is then transmitted to the client in message 445. The client (and notably application 105) now performs the extra step of decrypting the data:

response_data=$E^{-1}$(enc_data,$T2$)

Here, $E^{-1}$ is the decryption function, which is known to the application 105. Now, a network stack sniffer running on the client does not find the response data in the clear and would have to go through the process of code analysis to find where T2 is buried in the application and then further decipher how T2 is used to generate keying material for decryption.

As will be appreciated, the amount of work that the attacker must do to get at the sensitive data can be made arbitrarily complex. In particular, the embodiments of FIGS. 5 and 6 provide additional obstacles that an attacker must overcome to gain access to any secure data.

Figure 5:
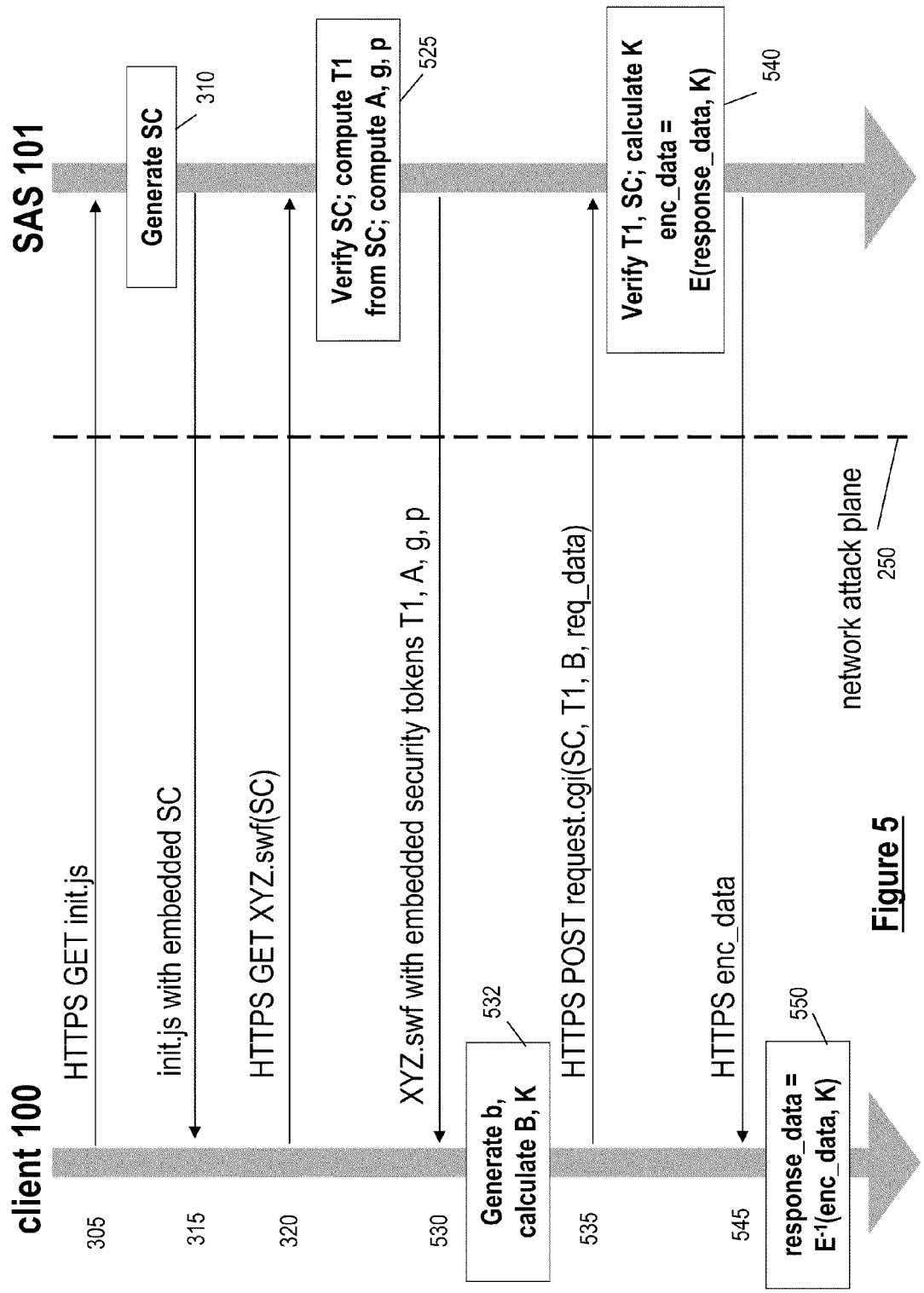
FIG. 5 is a ladder flow diagram depicting communications between the application server and client in another embodiment of the present invention, in which a bulk encryption K is agreed upon without the transmission of K, using PKI key exchange.
Figure 6:
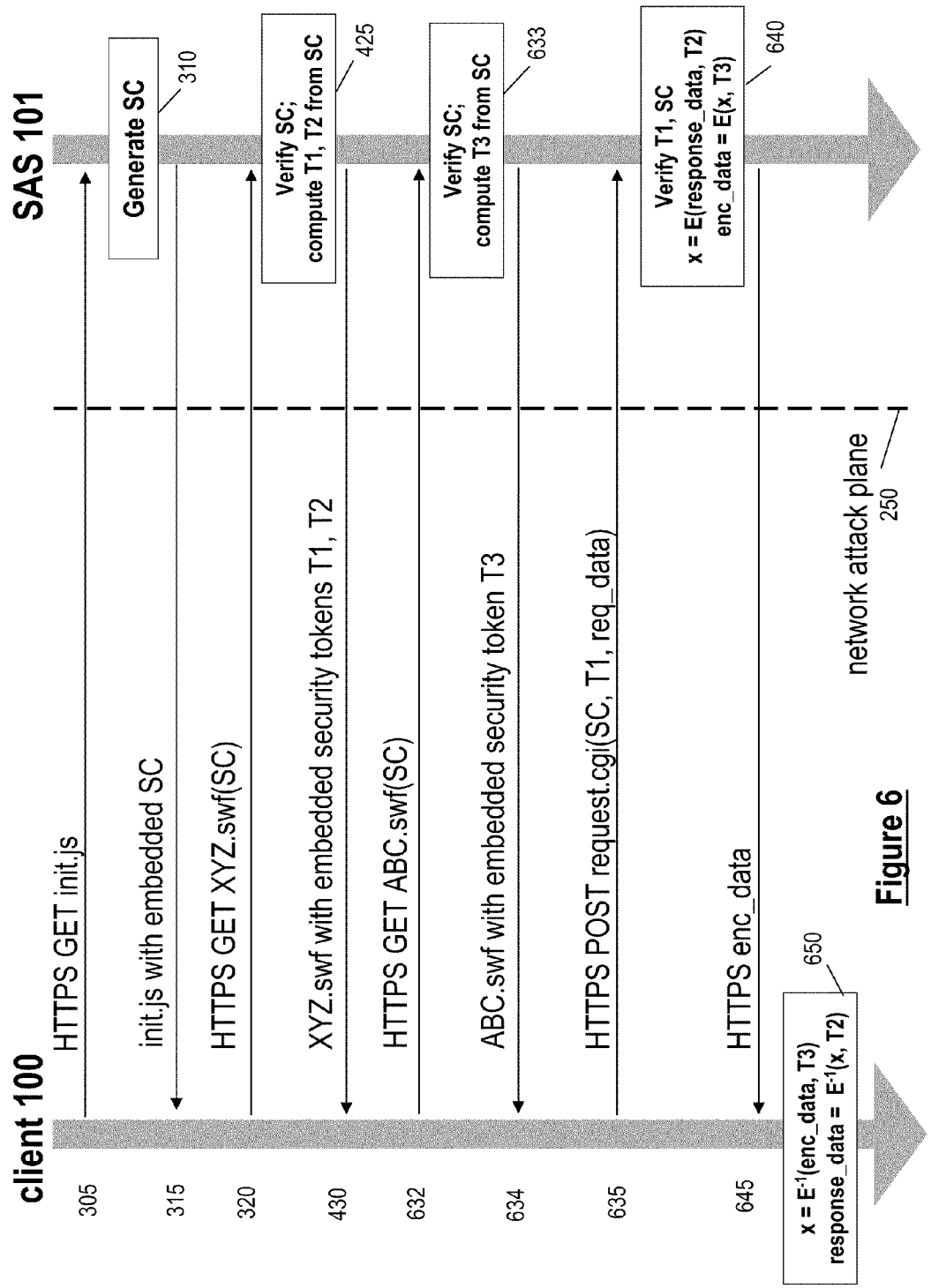
FIG. 6 is a ladder flow diagram depicting communications between the application server and client in yet another embodiment of the present invention, in which two downloaded applications, each with embedded cryptographic tokens, are required to cooperate in order to decrypt sensitive data.

In FIG. 5 the server-client communications make use of Diffie-Hellman key exchange, allowing the client and server to agree on a key K without ever transmitting the value over the network. This cryptographic protocol is described in "Diffie-Hellman Key Exchange" Wikipedia, available at http://en.wikipedia.org/wiki/Diffie_hellman, the contents of which are incorporated herein by reference.

With reference to FIG. 5, the following notation is used:
a=SA server's private key (random number)
A=SA server's public key (generated from a; optionally published and optionally signed by a certificate authority)
g=a generating element of cyclic group G (per Diffie-Hellman)
p=a prime number
b=client's private key (random number)
B=client's public key (generated from b)

As shown, messages and steps 305, 310, 315, and 320 operate as described above in connection with FIG. 3. In step 525, the SA server computes T1 (so that it is tied to SC as above). SA server 101 further computes values for public key A, as well as for prime p and generating element g in accordance with Diffie-Hellman key exchange. SA server 101 then embeds the values for T1, A, g, and p into XYZ.swf, and the resulting altered XYZ.swf is sent to the client in message 530.

In alternative embodiments, p and g may be constant for all instances of application XYZ.swf and so they could instead be hardwired into the application's code. The value of A may also be transmitted implicitly rather than explicitly, if the value of A is, for example, available via the server's public key for its SSL encryption.

Once the XYZ.swf application has been received by the client 100 the application performs step 532, in which it generates a random private key b, and then computes:

$B=g^b \bmod p$ $K=A^b \bmod p$

When XYZ.swf requests sensitive data in message 535, it sends SC and T1 (as in FIGS. 3 and 4), but also B. At step 540, the server not only verifies SC and T1 but also computes:

$K=B^a \bmod p$.

Next, the server computes the encrypted data enc_data=$E$(response_data,$K$).

This encrypted data is sent back to the client 100 in message 545. The downloaded application XYZ.swf can then decrypt the data as shown at step 550:

response_data=$E-1$(enc_data,$K$)

Thus, in the protocol of FIG. 5, even if an attacker has analyzed and understood the application code, it must somehow get at the value of b in protected memory in order to decrypt the data, a significantly more onerous obstacle than intercepting data on the network stack.

The embodiment of FIG. 6 builds upon the embodiment of FIG. 4 and illustrates a further manner for increasing the security obstacles that a potential attacker must overcome. In FIG. 6, the initial messages and steps 305, 310, 315, 320, 425, and 430 are essentially the same as in FIG. 4. The one difference is that the code in init.js that is sent to the client in message 315 specifies two applications, XYZ.swf and ABC.swf, which are to be loaded. As shown, the second application ABC.swf is downloaded pursuant to request message 632.

At step 633, the SA server 101 verifies SC and computes a new security token T3 that the server subsequently embeds in ABC.swf and returns to the client in message 634. This new application serve as a "helper" application that acts to decrypt any sensitive data received from the SA server 101.

In message 635, application XYZ.swf requests sensitive data, and once again passes tokens SC and T1 to the server. In processing step 640, the server verifies SC and T1, but now performs a more complex encryption of the data:

$x=E$(response_data,$T2$)

enc_data=$E(x,T3)$ or equivalently:

enc_data=$E(E$(response_data,$T2$),$T3$)

This dual-step encryption is meant to be illustrative only. It will further be understood that T2 and T3 need not be used in their entirety, but may be used to deterministically generate the actual keys. Furthermore, as an alternative, the strength of T2 and T3 may be combined by use a combining function C to create new keying material from the two of them for a single encryption:

enc_data=$E$(response_data,$C(T2,T3)$)

Furthermore, one of ordinary skill in the art may employ various other encryption techniques to achieve equivalent or comparable protection.

The resulting encrypted data is passed back to the client in the response message 645. However, in this embodiment, the client application XYZ.swf needs to call on the helper application ABC.swf to obtain access to the keying data. Application ABC.swf then decrypts that data in processing step 650 as follows:

$$\text{response\_data} = E^{-1}(E^{-1}(\text{enc\_data}, T3), T2)$$

As will be appreciated, it is possible for browser resident applications such as XYZ.swf and ABC.swf to communicate in ways that cannot be easily intercepted. For example, in Flash, different SWF applications can use the LocalConnection facility, or TCP/IP sockets, to communicate. Similarly, Java allows for finding other applets via the AppletContext facility.

In this manner, the embodiment of FIG. 6 introduces significant additional barriers to the attacker, notably by requiring an attacker to decipher a mix of applications and to establish which one(s) have the keying material. There could be more than one helper application as the above-described mechanism scales to more than two applications. Additionally, "decoy" helper applications, which are intended to do nothing but confuse a potential attacker, may also be employed.

In a further embodiment (not illustrated), the use of PKI-based key exchange security protocols (as in the embodiment of FIG. 5) may also be employed in conjunction with one or more helper applications (as in the embodiment of FIG. 6).

While security can never be guaranteed in a system in which a client machine is not itself a secure platform, the security measures provided by the system and method of the present invention serve to thwart Trojans attacks and also makes reverse engineering attacks substantially more difficult. This is preferably accomplished by tying a specific instance of the downloaded application to the specific browser session in which it is running, ensuring that the application is not tampered with (for example, by moving it from one browser instance to another), and by ensuring that the application instance can be used for only a limited amount of time.

The security measures employed by the present invention can in particular serve to: ensure that a specific downloaded application was meant to be executed within a specific browser context; ensure that the SA server only provides responses to requests generated by the application within a certain timeout period; and protect sensitive data that, even if sniffed on the network stack below the SSL/TLS layer, will be encrypted using keys.

While all of the above-described embodiments considerably hinder an attacker's ability to sniff values, an attacker could still analyze the application code and then try to emulate the client-server communications or build a custom virtual machine for running Flash or Java. Such attacks could potentially expose sensitive data stored on a single client machine.

However, with the above-described security measures of the present invention such an attacker would still generally be unable to compromise a large numbers of client machines in a uniform attack (as can be done with network stack sniffers or keystroke loggers). Additionally, if complex analysis of downloaded code is required of the attacker, the setting of appropriate timeouts for the security tokens helps minimize the chance of replay attacks, since the tokens in a given instance of the downloaded application will have timed out by the time such analysis is completed. Moreover, in order to carry out such an attack using custom JVMs or AVMs, the attacker must have privileges to read files on the client machine, execute code on the client machine, and make arbitrary network connections from the machine. Any attack that works by modifying the Java or Flash virtual machines requires installing executables far larger than the payloads in current Trojans, and compatibility issues would make such attacks expensive to engineer.

In this manner, the present invention generally prevents or at least considerably hinders many of the common forms of attack by re-framing the security issue in such as way that an attacker requires significant privileges to impersonate a downloaded application. Such obstacles would generally lead an attacker to target other, more vulnerable systems and information that do not employ the above-described security measures.

While the invention has been described in conjunction with specific embodiments, it is evident that numerous alternatives, modifications, and variations will be apparent to those skilled in the art in light of the foregoing description.

The invention claimed is:

1. A method for securing communications between a server and an application downloaded over a network onto a client of the server, comprising:
   receiving a first request from the client, and in response generating a first security token, the first security token being a session credential security token;
   sending the session credential security token to the client;
   receiving a second request from the client to download the application, the second request including the value of the session credential security token;
   in response to the second request, verifying that the value of the session credential security token is valid and, if so, generating a second security token that is tied to the session credential security token;
   embedding the second security token in application code prior to sending an instance of the application code to the client, the instance of the application code being tied to the session credential security token;
   sending the instance of the application code with the embedded security token to the client;
   receiving a request for data from the application running on the client, the request including the value of the session credential security token and the value of the embedded security token; and
   verifying that the values of the session credential security token and the second security token received with the data request are valid at least in part by determining that the values are cryptographically tied to one another, and, if so, sending the requested data to the client.

2. The method of claim 1 wherein sending the session credential security token to the client comprises sending the value of the session credential security token to the client as a cookie.

3. The method of claim 1 wherein verifying that the value of the session credential security token is valid in response to the second request comprises extracting and verifying the validity of signature data and a time stamp from the session credential security token.

4. The method of claim 1 wherein verifying that the values of the session credential security token and the second security token received with the data request are valid further comprises verifying that client IP address information encoded in each token matches the client IP address information associated with the data request.

5. The method of claim 1 wherein verifying that the values of the session credential security token and the second security token received with the data request are valid further comprises verifying that the tokens have not expired.

6. A method for securing communications between a server and an application downloaded over a network onto a client of the server, comprising:

receiving a first request from the client, and in response generating a first security token, the first security token being a session credential security token;

sending the session credential security token to the client;

receiving a second request from the client to download the application, the second request including the value of the session credential security token;

in response to the second request, verifying that the value of the session credential security token is valid and, if so, generating a second security token that is tied to the session credential security token;

embedding the second security token in application code prior to sending the application code to the client;

sending the application code with the embedded security token to the client;

receiving a request for data from the application running on the client, the request including the value of the session credential security token and the value of the embedded security token; and verifying that the values of the session credential security token and the second security token received with the data request are valid at least in part by determining that the values are cryptographically tied to one another, and, if so, sending the requested data to the client;

wherein sending the session credential security token to the client comprises:

embedding the session credential security token into download initiation code that enables the client to send a request for downloading of the application; and sending the download initiation code with the embedded session credential security token to the client.

7. A method for securing communications between a server and an application downloaded over a network onto a client of the server, comprising:

receiving a first request from the client, and in response generating a first security token, the first security token being a session credential security token;

sending the session credential security token to the client;

receiving a second request from the client to download the application, the second request including the value of the session credential security token;

in response to the second request, verifying that the value of the session credential security token is valid and, if so, generating a second security token that is tied to the session credential security token;

embedding the second security token in application code prior to sending the application code to the client;

sending the application code with the embedded security token to the client;

receiving a request for data from the application running on the client, the request including the value of the session credential security token and the value of the embedded security token; and verifying that the values of the session credential security token and the second security token received with the data request are valid at least in part by determining that the values are cryptographically tied to one another, and, if so, sending the requested data to the client;

wherein embedding the second security token in application code comprises splitting the second security token into a plurality of portions and embedding each of said portions at a different location within the application code.

8. A method for securing communications between a server and an application downloaded over a network onto a client of the server, comprising:

receiving a first request from the client, and in response generating a first security token, the first security token being a session credential security token;

sending the session credential security token to the client;

receiving a second request from the client to download the application, the second request including the value of the session credential security token;

in response to the second request, verifying that the value of the session credential security token is valid and, if so, generating a second security token that is tied to the session credential security token;

embedding the second security token in application code prior to sending the application code to the client;

sending the application code with the embedded security token to the client;

receiving a request for data from the application running on the client, the request including the value of the session credential security token and the value of the embedded security token;

verifying that the values of the session credential security token and the second security token received with the data request are valid at least in part by determining that the values are cryptographically tied to one another, and, if so, sending the requested data to the client;

upon verifying that the value of the session credential security token is valid in response to the second request, generating a third security token that is tied to the session credential security token;

embedding the third security token in application code prior to sending the application code to the client; and upon receiving the request for data, encrypting the requested data using the third security token prior to sending the requested data to the client.

9. A method for securing communications between a server and an application downloaded over a network onto a client of the server, comprising:

receiving a first request from the client, and in response generating a first security token, the first security token being a session credential security token;

sending the session credential security token to the client;

receiving a second request from the client to download the application, the second request including the value of the session credential security token;

in response to the second request, verifying that the value of the session credential security token is valid and, if so, generating a second security token that is tied to the session credential security token;

embedding the second security token in application code prior to sending the application code to the client;

sending the application code with the embedded security token to the client;

receiving a request for data from the application running on the client, the request including the value of the session credential security token and the value of the embedded security token;

verifying that the values of the session credential security token and the second security token received with the data request are valid at least in part by determining that the values are cryptographically tied to one another, and, if so, sending the requested data to the client;

receiving a third request from the client to download a second application, the request including the value of the session credential security token;

upon verifying that the value of the session credential security token is valid in response to the third request, generating a third security token that is tied to the session credential security token;
embedding the third security token in the second application code;
sending the second application code to the client; and
upon receiving the request for data, encrypting the requested data using the third security token prior to sending the requested data to the client.

10. A method for securing communications between a server and an application downloaded over a network onto a client of the server, comprising:
receiving a first request from the client, and in response generating a first security token, the first security token being a session credential security token;
sending the session credential security token to the client;
receiving a second request from the client to download the application, the second request including the value of the session credential security token;
in response to the second request, verifying that the value of the session credential security token is valid and, if so, generating a second security token that is tied to the session credential security token;
embedding the second security token in application code prior to sending the application code to the client;
sending the application code with the embedded security token to the client;
receiving a request for data from the application running on the client, the request including the value of the session credential security token and the value of the embedded security token;
verifying that the values of the session credential security token and the second security token received with the data request are valid at least in part by determining that the values are cryptographically tied to one another, and, if so, sending the requested data to the client;
upon verifying that the value of the session credential security token is valid in response to the second request, generating a third security token that is tied to the session credential security token;
embedding the third security token in application code prior to sending the application code to the client;
receiving a third request from the client to download a second application, the third request including the value of the session credential security token;
upon verifying that the value of the session credential security token is valid in response to the third request, generating a fourth security token that is tied to the session credential security token;
embedding the fourth security token in the second application code;
sending the second application code to the client; and
upon receiving the request for data, encrypting the requested data using the third security token and the fourth security token prior to sending the requested data to the client.

11. A method for securing communications between a server and an application downloaded over a network onto a client of the server, comprising:
receiving a first request from the client, and in response generating a first security token, the first security token being a session credential security token;
sending the session credential security token to the client;
receiving a second request from the client to download the application, the second request including the value of the session credential security token;
in response to the second request, verifying that the value of the session credential security token is valid and, if so, generating a second security token that is tied to the session credential security token;
embedding the second security token in application code prior to sending the application code to the client;
sending the application code with the embedded security token to the client;
receiving a request for data from the application running on the client, the request including the value of the session credential security token and the value of the embedded security token;
verifying that the values of the session credential security token and the second security token received with the data request are valid at least in part by determining that the values are cryptographically tied to one another, and, if so, sending the requested data to the client;
upon verifying that the value of the session credential security token is valid in response to the second request, generating a first public key value in accordance with a cryptographic protocol;
embedding the public key value in application code prior to sending the application code to the client;
upon receiving the request for data that includes a second public key value in accordance with the cryptographic protocol, calculating an encryption key value; and
encrypting the requested data using the encryption key value prior to sending the requested data to the client.

12. A method for securing communications between a server and an application downloaded over a network onto a client of the server, comprising:
sending a first request to the server;
receiving a first security token, the first security token being a session credential security token from the server;
sending a second request to the server to download the application, the request including the value of the session credential security token;
receiving an instance of application code from the server, the instance of the application code having a second security token that is tied to the session credential security token embedded therein, the instance of the application code being tied to the session credential security token;
extracting the second security token from the application code;
sending a request for data, the request including the value of the session credential security token and the value of the second security token; and
receiving the requested data from the server.

13. The method of claim 12 further comprising:
sending a third request to the server to download a second application, the third request including the value of the session credential security token;
receiving the code of the second application from the server, the second application code having a third security token that is tied to the session credential security token embedded therein;
extracting the third security token from the code of the second application; and
decrypting the requested data that is received from the server using the third security token.

14. The method of claim 12 wherein the application code further has a third security token that is tied to the session credential security token embedded therein;
the method further comprising:
extracting the third security token from the application code;

sending a third request to the server to download a second application, the third request including the value of the session credential security token;

receiving the code of the second application from the server, the second application code having a fourth security token that is tied to the session credential security token embedded therein;

extracting the fourth security token from the code of the second application; and decrypting the requested data that is received from the server.

15. A method for securing communications between a server and an application downloaded over a network onto a client of the server, comprising:

sending a first request to the server;

receiving a first security token, the first security token being a session credential security token;

sending a second request to the server to download the application, the second request including the value of the session credential security token;

receiving application code from the server, the application code having a second security token that is tied to the session credential security token embedded therein and a third security token that is tied to the session credential security token embedded therein;

extracting the second security token from the application code;

sending a request for data, the request including the value of the session credential security token and the value of the second security token;

receiving the requested data from the server;

extracting the third security token from the application code; and decrypting the requested data that is received from the server using the third security token.

16. A method for securing communications between a server and an application downloaded over a network onto a client of the server, comprising:

receiving a first request from the client, and in response generating a first security token, the first security token being a session credential security token;

sending the session credential security token to the client;

receiving a second request from the client to download the application, the request including the value of the session credential security token;

in response to the second request, generating, based in part on the session credential information, a second security token;

sending an instance of application code and the second security token to the client, the instance of the application code being tied to the session credential security token;

receiving a request for data from the application running on the client, the request including the value of the session credential security token and the value of the second security token; and verifying that the value of the session credential security token and the value of the second security token received with the data request are valid and, if so, transmitting the requested data to the client.

17. The method of claim 16 wherein the security token is embedded in the application code prior to sending the application code to the client.

18. The method of claim 16 wherein the session credential information includes the client IP address and a time indicative of when the application code was sent to the client.

* * * * *